June 17, 1969  G. W. GERLACH ET AL  3,450,948
ELECTRICAL DISTRIBUTION SYSTEM
Filed March 1, 1967
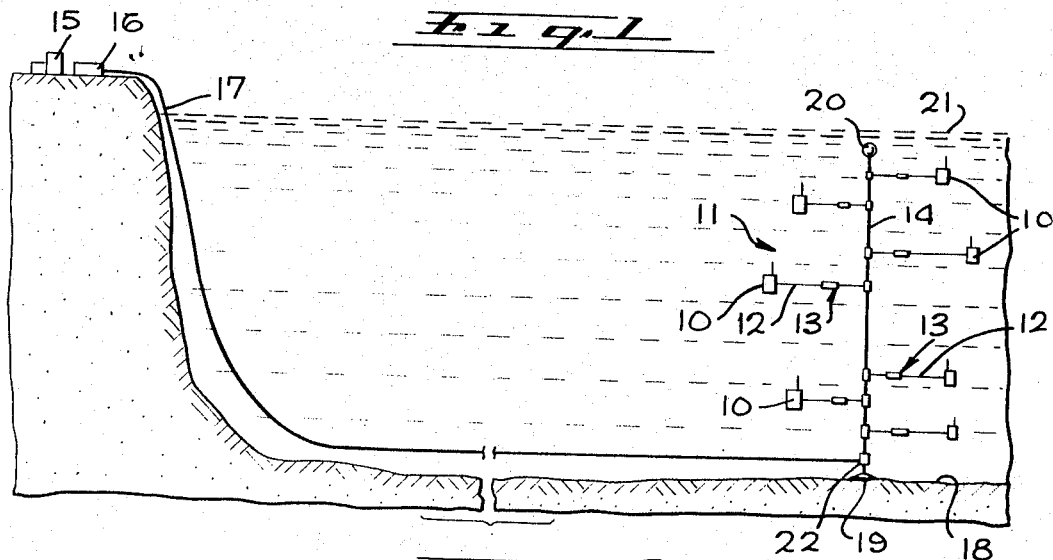
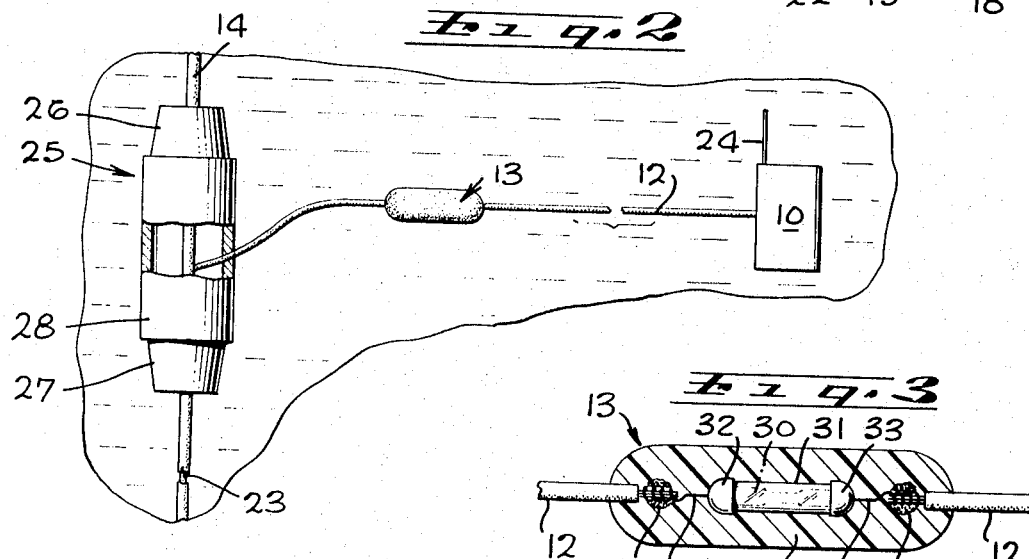
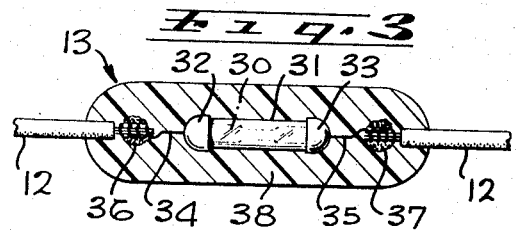
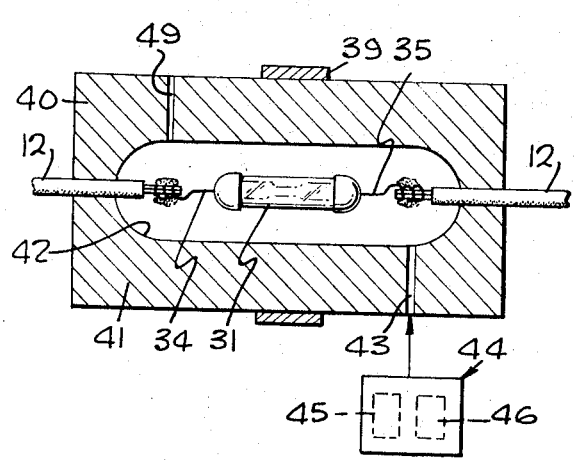
GLENN W. GERLACH
ALBERT E. PAUL
INVENTORS
BY
Roger A. Marro

United States Patent Office 3,450,948
Patented June 17, 1969

---

3,450,948
ELECTRICAL DISTRIBUTION SYSTEM
Glenn W. Gerlach, Thousand Oaks, Calif., and Albert E. Paul, Savage, Md., assignors to The Bunker-Ramo Corporation, Canoga Park, Calif., a corporation of Delaware
Filed Mar. 1, 1967, Ser. No. 619,824
Int. Cl. H02h 3/00, 7/00, 5/04
U.S. Cl. 317—26   13 Claims

ABSTRACT OF THE DISCLOSURE

An electrical distribution system for furnishing power to submerged power consuming stations carried on the end of conductors tethered from a common power cable incorporating a fuse apparatus in close proximity to the cable for the protection of all of the stations in the array in the event of malfunction or damage to the station or to a length of conductor disposed between the fuse apparatus and the station.

Background of the invention

*Field of the invention.*—This invention relates to electrical distribution systems and, more particularly, to a novel system for the reliable transmission of electricity from a power station to a plurality of power consuming stations or equipment for ultimate use which incorporates a novel fuse apparatus capable of employment in a high pressure, saline water environment.

*Description of the prior art.*—For many years, it has been almost universal practice to install electrical distribution systems by stringing electrical conductors between a source of power and a plurality of power consuming stations. The equipment at each power consuming station to be operated by the power therefrom is generally protected against electrical overload conditions by means of a fuse element incorporated into the electrical conductor at a location close to the consuming station, as for example, locating the fuse element immediately adjacent the power input terminals to a house, plant or other facility. Additional equipment protection is provided by installing other fuses in the power circuit of the power consuming equipment per se located within the home, plant or other facility.

Numerous attempts have been made to install such conventional electrical distribution systems both underground and undersea, but these have met with numerous difficulties particularly in view of the fact that the electrical conductors as well as the fusing elements are not able to withstand the extreme environmental conditions from high pressure, moisture, saline solutions, or the like. In most of these installations, it has been found to be necessary to install the electrical conductors in protective conduits and also to install other components such as transformers, switches, fuses, and the like in protective pressure housings which are substantially moisture proof and which consequently are of relatively expensive construction. Since most of the components employed in conventional systems are of the type which have heretofore been used in elevated systems, frequent failures are experienced since these components are not properly designed and constructed to withstand the extreme conditions encountered in direct underground or undersea burial use.

Furthermore, in a marine or saline water environment there are conditions which when fully appreciated militate against the foregoing system installation practice. This is especially pertinent where each consuming station provides only one fuse interposed between a power source cable and the consuming station. In marine applications, this practice is desirable from the standpoints of economy and reliability. For example, an undersea power and signal distributing array is desired which incorporates a number of telemetry monitoring stations, sonar transducing stations, or the like that are connected in parallel via lead conductors to a common cable which supplies power to the consuming stations or equipment as well as a communication link from each of the consuming stations to a central station above the surface of the water. Generally, when a failure of a sensor or transducer module depending from the undersea array occurs, the entire system is caused to fail. It can be seen that an electrical short circuit across the system produced by a single consuming station or equipment can readily result in a complete breakdown or failure of the entire system. Experience has shown that the short circuit may be caused by fish biting through the lead conductor leading from the common supply cable to a given consuming station, or by a fish biting into a portion of the station and thereby causing sea water to enter the station and produce an electrical short.

Normally, it may be suggested that placing the fuse within each consuming station or equipment might be adequate, or, interposing a fuse at any place along the lead conductor immediate the power supply cable and the consuming station would suffice. However, problems with these two approaches are simply that if the fuse is placed within the station or equipment and the station or equipment takes in sea water the fuse is effectively short circuited by the salt water. Similarly, if the fuse is placed outside the station in close proximity thereto, then a fish biting through the cable between the fuse and the common supply cable will produce a short circuit and cause the entire array to fail.

Summary of the invention

The foregoing difficulties and problems encountered with conventional electrical distribution systems are obviated by the present invention by providing a fuse element in a location as close to the power supply cable as is feasible, and by encapsulating the fuse with a material such as polyurethane which prevents sea water from reaching the fuse and effectively short circuiting the fuse.

To be effective, it is desirable to insert a fuse in each lead conductor between the consuming station modules and the power supply cable, external to both. To be so installed the fuse is required to be mechanically constructed so as to withstand ambient pressures of 2,500 p.s.i. and must be readily insulated from the sea water environment. The fuse apparatus contemplated by the present invention satisfies these requirements by employing a fuse having the opposite ends of a ribbon element terminating in axial leads wherein the leads are connected to polyethylene insulated electrical lead conductor wires by overlapping, wrapping, and soldering. The fuse apparatus assembly is placed in a two-piece injection mold and molten polyethylene is forced into the mold under heat and pressure with a very precise temperature and variable pressure control so as to densify the polyethylene without prestressing and crushing the fuse ribbon. Also, the fuse is encapsulated by the molten polyethylene in a manner so as not to melt the solder joint which would cause lead separation. The molten mass is allowed to cool and becomes an integral link in the electrical conductor leading from the power cable to the consuming equipment module.

Therefore, the present invention may be referred to as an automatic leak detector such that if water enters any part of the electrical system due to deterioration of the conductor insulation, fish bite, etc., the fuse apparatus will automatically be severed by the current overload so that the water leak will be isolated and the remainder of the system allowed to operate unaffected from the conductor failure.

Brief description of the drawings

The features of the present invention which are believed to be novel are set forth with particularity in the appeneded claims. The present invention, both as to its organization and manner of operation, together with further objects and advantages thereof, may best be understood by reference to the following description taken in connection with the accompanying drawings in which:

FIGURE 1 is a diagrammatic illustration showing the novel high pressure encapsulation fuse apparatus of the present invention incorporated into a novel electrical power distribution system for a typical marine equipment array;

FIG. 2 is an enlarged fragmentary view of a typical lead conductor wire breakout showing the encapsulated fuse apparatus interconnected between the main power cable and a consuming electrical equipment module of the array;

FIG. 3 is an enlarged cross-sectional view of the encapsulated fuse apparatus coupled in the electrical lead conductor of FIG. 2; and FIG. 4 is a sectional view of the fuse element of the apparatus disposed in a mold preparatory to encapsulation.

Description of the preferred embodiment

Referring to FIG. 1, an electrical distribution system is illustrated in accordance with the present invention in which its power carrying conductors as well as other components of the system are adapted to be directly buried or submerged within a body of sea water such as in an off-shore location in the ocean. The system includes an undersea array of power consuming stations all electrically connected to a common power cable by means of tethered lead conductors each incorporating an encapsulated fuse capable of withstanding the adverse effects of a high presure saline water environment. In general, the array 11 is an undersea temperature measuring system comprising a vertically moored coaxial submarine cable 14 with the plurality of monitoring stations 10 distributed along its length and connected electrically in parallel to the coaxial cable 14. Alternatively, the modules 10 included in the array 11 may take the form of an undersea power and signal distributing system where a number of telemetry monitoring stations, sonar transducing stations, or the like are represented. Additionally, a communication link is provided from each of the station modules to a central station located above the surface of the water or on shore. In the present instance an on-shore central station is indicated by numeral 15 while numeral 16 represents a power station for supplying power to the array via a primary power cable 17. The array of modules depending from cable 14 is anchored on an ocean floor 18 by means of a suitable anchoring means 19 while the opposite end of cable 14 is stabilized by means of a conventional buoy 20. It is to be noted that the buoy 20 is located beneath a surface level 21 of the ocean. The primary power cable 17 is coupled to the cable 14 so as to be an extension thereof by means of a conventional coupling apparatus 22 located in close proximity to the anchor 19. In one application of the present invention the primary power cable 17 extends in length for approximately ten miles off-shore from the power station 16 for furnishing approximately two amperes of DC current at approximately 125 volts. The undersea monitoring module array is anchored at a depth of about 2,000 feet so that each of the modules monitors or senses a different stratum of the ocean. Data depicting measured characteristics of the ocean may be transmitted back to the shore station by conventional multiplexing techniques based upon the superimposition of pulse or AC data signals on the power supply conductor.

Referring now to FIG. 2, an enlarged view is shown of a typical lead conductor breakout indicated in the general direction of arrow 25 which is interposed in the power cable 14 so that lead connectors 12 may be electrically connected to the main cable and laterally extended to connect with monitoring modules 10 on their free ends. The breakout fixture 25 includes clamping means 26 and 27 disposed on opposite ends of a housing 28 through which a portion of the lead conductor 12 extends in water tight relationship therewith. The details of the electrical breakout are more clearly shown in copending patent application entitled, "Process for Salvaging Armored Cable and Structures Used for the Same," having Ser. No. 591,858, filed Nov. 3, 1966, and such details as are described in the copending patent application are incorporated into the present specification as is specifically set forth. It is to be particularly noted in FIG. 2 that a fuse apparatus 13 is located as close to the breakout fixture 25 and the cable 14 as is feasible. In this connection the fuse apparatus is located external to both the monitoring module 10 and the breakout 25 and may be referred to as being remote from the module 10 and in close proximity to the breakout 25. The fuse apparatus is characterized by having a mechanical construction adapted to withstand ambient pressures of 2,500 p.s.i. and is further characterized by being insulated from the salt water environment. Preferably, the lead conductor 12 is a polyethylene insulated electrical wire or stranded wires and the fuse apparatus 13 is encapsulated in a relatively fixed housing of polyethylene so as to be integrally formed with the insulation of the cable at the opposite ends of the fuse apparatus.

An electrical return circuit for the power furnished from the power station to each of the consuming modules or equipments is provided by enclosing cable 14 with a braided wire casing 23 suitably insulated from the central power conductor or plurality of power conductors as the case may be, leading to the respective conductors 12. A current return path is provided by the saline water surrounding the cable and conductors between the power consuming module or station 10 and its respective breakout 25. Preferably, the current return path includes a discharge probe 24 that is electrically coupled to the casing 23 via the water return path. In one form the probe may be composed of zinc/copper alloy so that corrosion is minimized. A feature of the invention resides in the fact that since the current return path through the water is adjacent to the length of each conductor 12, the electrodification of this area serves as an abatement to the presence of fish and other marine life so that the critical length of the conductor is further protected against damage thereby.

Referring now in detail to FIG. 3, an enlarged view of the encapsulated fuse apparatus 13 is illustrated as being interposed between opposing ends of the lead conductor 12 so that the encapsulated fuse may serve as an expendable device for opening an electrical circuit when the current passing through the circuit becomes excessive. In essence, the fusing apparatus becomes a fusing device which consists principally of a section or segment of conductor strip 30 which may be referred to as a fusible element, of such properties and proportions that excessive current will melt it and thereby sever the circuit. Fuse elements such as those contemplated by the present invention are employed to protect circuit conductors and circuit components from damage which would result from sustained excessive current carried thereby. For fuse purposes, the fusible element or ribbon 30 may be rated according to the voltage of the circuit the current intended to be carried continuously, and the magnitude of excessive current the ribbon is to interrupt. The fuse ribbon 30 is contained in an envelope 31 of glass which surrounds the fusible ribbon and serves as a means to quench the arc that forms when the fusible element melts. Such a provision greatly enhances the ability of the device of the present invention to achieve thermal stability not only when a fusible element melts, but during the operation of the electronic circuitry interconnected by the lead conductor 12. The opposite ends of the fusible element 30 are terminated in caps 32 and 33, respectively, each of which forms a securement with axial lead wires 34 and 35.

The interruption time required for excessive current to melt the fusible element 30 varies inversely as the value of the current increases. However, the nature of this variation, namely, the shape of the time-current curve, depends to a marked degree upon the size, shape, and material of the fusible material of the element. The time required to quench the arc after melting depends upon the nature of the arc quenching material as well as the fusible element material. The sum of the melting and arcing time is known in the art as the interrupting time.

The fusing apparatus 13 of the present invention is assembled in the lead conductor 12 by initially severing the conductor 12 at a location in close proximity to the breakout 25 and portions of the insulation surrounding the electrical wires of the conductor are removed to expose the bare wires. The lead wires 34 and 35 of the fuse device are connected to the electrical wires of the conductor by overlapping, wrapping, and soldering so that a mechanical and electrical splice is produced. Numerals 36 and 37 indicate the solder connections therebetween. Preferably, the axial leads 34 and 35 are No. 18 copper leads which are generally considered oversized as compared with the conventional fuse leads of No. 22 standard construction. The entire fuse and lead connections with the conductor are encapsulated in a polyethylene housing 38 under sufficient heat and pressure to assure that the housing integrally adheres and binds with the insulating material of the lead conductor. The polyethylene housing is characterized by being of a relatively soft as opposed to firm texture, nonfragile, having a controlled degree of elasticity, and being of a nonporous nature to both gases and liquids. By means of the polyethylene coating, the encapsulation of the fuse prevents the water from reaching the fuse even under high pressure applications.

Referring now to FIG. 4, the fuse device is illustrated as being in position for receiving the polyethylene encapsulation material. The axial leads 34 and 35 are illustrated as having been overlapped and wrapped about the electrical wires carried by the lead conductor 12. The axial wires are soldered in position after having been wrapped to provide a soldered splice so that a good mechanical and electrical securement is produced. This assembly is placed in a two-piece injection mold comprising pieces 40 and 41 having a mating cavity formed in the opposing faces thereof which combine to define the thickness and shape of the housing. The cavity is represented by numeral 42 in which the fuse element is situated between the opposing ends of the lead conductor 12. To maintain the fuse element in a fixed position, the two-mold pieces clamp against the insulation of the lead conductor 12 and the mold pieces are held in forcible contact therewith by means of a suitable clamping device, such as a U-shaped clamp 39. Molten polyethylene is introduced into the cavity 42 via a passageway 43 which is suitably connected to an injection means 44 which contains heat means 45 and pressure means 46. A passageway 49 is employed to exhaust air from the cavity as the polyethylene is introduced therein. The heat and pressure means are so controlled that the molten polyethylene material is injected into the cavity 42 without causing the solder splices 36 and 37 to melt and sever. This feature is important inasmuch as the electrical wires of the lead conductor 12 may be under tension, such as when a fuse apparatus is being replaced in the field, so that if the solder is melted, the tension of the lead conductor may cause the electrical wires of the conductor to pull away from the axial leads of the fuse element. The clamping action of the two-piece injection mold absorbs part of the tension developed on the lead conductor 12; however, inasmuch as the clamping portion of the two-piece mold about the lead conductor engages only the insulation surrounding the electrical wires, some tension may be directly applied to the fuse element via the electrical wire.

Therefore, it can be seen that the electrical distribution system of the present invention provides a novel means for strategically locating a fusing device in the system which is immediately adjacent to a breakout in a power cable and wherein the novel fuse apparatus of the present invention employs a molded polyethylene housing capable of withstanding high pressure and attack from seawater so that additional pressure vessels are not required which would compound the problem of seals and feedthroughs. The fuse apparatus may be readily installed in the field for repair and maintenance purposes and when incorporated into a system as described above, the fusing elements adequately protect other monitoring modules in the array in the event one of the modules should fail due to a current overload condition.

While particular embodiments of the present invention have been shown and described, it will be obvious to those skilled in the art that changes and modifications may be made without departing from this invention in its broader aspects, and therefore the aim in the appended claims is to cover all such changes and modifications as fall within the true spirit and scope of this invention.

The embodiments of the invention in which an exclusive property or privilege is claimed are defined as follows:

1. In an electrical distribution system for supplying power to an array of power consuming modules submerged in a high pressure and saline water environment wherein the modules are tethered from an anchored and stabilized common power cable at spaced intervals along its submerged length, the improvement which comprises:
   an insulated lead conductor coupled between the common power cable and each of the monitoring modules so that the monitoring modules are distributed along the length of the power cable in power receiving relationship therewith; and
   a fuse apparatus mechanically and electrically interposed in each of said lead conductors external to its associated module and the power cable in immediate and close proximity to the power cable whereby said fuse apparatus is adapted to electrically disconnect the module from the power cable in the event of any electrical failure in the module or in the length of lead conductor extending between said fuse apparatus and its associated module so that other modules in the array will not be affected thereby.

2. The invention as defined in claim 1 wherein each lead conductor is severed to expose electrical wires arranged in opposing spaced apart relationship;
   a fusible device having axial leads projecting from the opposite ends thereof adapted to overlap the electrical wires and to be mechanically and electrically secured therewith by a spliced connection; and
   encapsulating means formed about said fusible device and said spliced connection having composition characteristics adapted to protect said fuse apparatus from the high pressure and saline water environment.

3. The invention as defined in claim 2 wherein said spliced connection comprises said axial leads being wrapped about the respective electrical wires and electrically bonded thereto by a mass of solder.

4. The invention as defined by claim 3 wherein said encapsulating means is composed of molded polyethylene extending between the opposing ends of the severed lead conductor in overlapping relationship therewith in intimate engagement with said spliced connections and said fusible device.

5. The invention as defined in claim 1 wherein said fuse apparatus includes a fusing element enveloped by an arc chamber and having axial leads outwardly extending from opposite ends thereof, said axial leads being mechanically and electrically spliced to opposing ends of the lead conductor; and an encapsulating housing composed of polyethylene disposed about said fuse apparatus in intimate contact with said arc chamber envelope and said axial leads so that said fuse element and said spliced axial leads are protected from the high pressure and saline water environment.

6. In an electrical distribution system adapted to be submerged in a high pressure and saline water environment for supplying power from a common power cable to an array of power consuming modules tethering therefrom via lead conductors laterally extending from breakouts arranged at fixed spaced intervals along the length of the power cable whereby each module is protected from damage caused by a short circuit failure by any other module in the array, the improvement which comprises:

a fusible device interposed in each of the lead conductors at a location external to its associated breakout and module and immediately adjacent to its associated breakout and substantially remote from its associated module whereby that portion of the lead conductor between said fusible device and the breakout represents a minimal length thereof exposed to damage of a character producing a short circuit and wherein the adverse effects of the occurrence of a short circuit in the module or the lead conductor length between said fusible device and the module will be isolated from the other modules of the array by said fusible device.

7. The invention as defined in claim 6 wherein said fusible device is covered with a body of encapsulating material composed of polyethylene applied thereto under heat and pressure so as to have characteristics of being impervious to moisture, attack from saline elements or adverse effects of high pressure.

8. The invention as defined in claim 7 wherein said body of encapsulating material is in bonding relationship with the insulation of the lead conductor so as to be integral therewith.

9. The invention as defined in claim 6 wherein said fusible device includes a saline moisture proof housing composed of the same material as the material of the lead conductor insulation so that substantial integral bonding occurs under heat and pressure when said fusible device is encapsulated.

10. An electrical distribution system adapted to supply electrical power to a plurality of electrical power consuming stations formed in an array submerged at a substantial depth in a body of relatively conductive fluid comprising:

a power cable submerged at least in part of the body of fluid, said cable comprising a plurality of encased conductors having an insulative protective shielding effective to electrically isolate said conductor from the conductive fluid;

a plurality of substantially fluid impervious conductor breakouts disposed along the length of said cable in fixed spaced-apart relationship, each of said breakouts having extending therefrom at least one conductor terminating at its free end in connection with a selected one of the plurality of power consuming stations; and a fuse apparatus interposed in each of said conductors situated in close proximity to its respective one of said breakouts remote from its respective power consuming station so as to separate each of said conductors into a first segment extending between said breakout and said fuse apparatus and a second segment extending between said fuse apparatus and the consuming station which is of a substantially longer length than said first segment whereby said first segment presents a minimal length exposed to damage of a character producing a short circuit, and wherein the adverse effects of the occurrence of a short circuit in the consuming station or in said second segment will be isolated from the other consuming stations of the array by said fuse apparatus.

11. The invention as defined in claim 10 wherein said fuse apparatus is encapsulated in a housing of material substantially identical to the shielding material of said lead conductor so as to be integrally formed therewith to have characteristics of being impervious to moisture, attack from saline elements or adverse effects of high pressure.

12. The invention as defined in claim 10 wherein said fuse apparatus interposed location in each of said lead conductors is external to said breakouts and the consuming stations.

13. The invention as defined in claim 10 wherein the electrical distribution system includes a current return path means adapted to employ a body of conductive fluid immediately adjacent each of said conductors situated between each of said breakouts and each of the power consuming stations, said body of fluid being chargeable to an electrical level by the current in said current return path sufficient to repel and abate marine life from attacking said first and said second segments of each of said conductors.

References Cited

UNITED STATES PATENTS 2,506,744   5/1950   Schindler et al.

JOHN F. COUCH, *Primary Examiner.*

J. D. TRAMMELL, *Assistant Examiner.*

U.S. Cl. X.R.

307—39, 94, 131; 317—40, 262